Feb. 19, 1957     O. K. COLEMAN     2,782,387
BY-PASS FACILITIES FOR SOCKET-TYPE ELECTRIC METERS
Filed Oct. 27, 1952     2 Sheets-Sheet 1
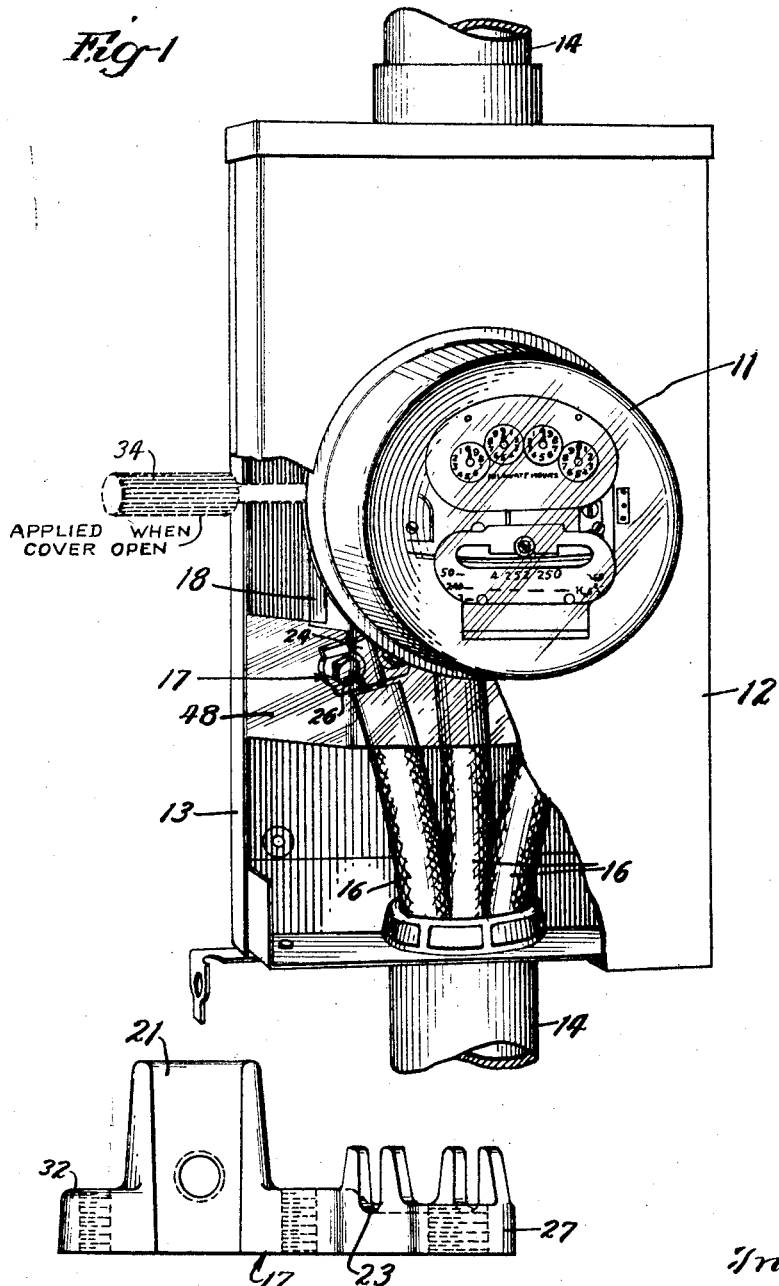
Inventor
Orville K. Coleman
By Louis Robertson   Atty.

Feb. 19, 1957 O. K. COLEMAN 2,782,387
BY-PASS FACILITIES FOR SOCKET-TYPE ELECTRIC METERS
Filed Oct. 27, 1952 2 Sheets-Sheet 2

Inventor
Orville K. Coleman
By Louis Robertson Attys.

United States Patent Office 2,782,387
Patented Feb. 19, 1957

2,782,387

BY-PASS FACILITIES FOR SOCKET-TYPE ELECTRIC METERS

Orville K. Coleman, West Lafayette, Ind., assignor, by mesne assignments, to Duncan Electric Company, Inc., Lafayette, Ind., a corporation of Indiana Original application October 1, 1949, Serial No. 119,074, now Patent No. 2,626,309, dated January 20, 1953. Divided and this application October 27, 1952, Serial No. 317,130

3 Claims. (Cl. 339—19)

This invention relates to by-pass facilities for watthour meters.

The present application is a divisional application of co-pending Serial No. 119,074 filed October 1, 1949, now Patent No. 2,626,309 dated January 20, 1953, filed jointly by the present applicant and Richard A. Road on October 1, 1949.

Objects and advantages of the invention will be apparent from the following description and from the drawings.

Figure 1 is a perspective view of the embodiment of the invention chosen for illustration, the cover being partly broken away. For illustration a by-pass connector tool is shown in place although it could only be used if the cover were removed.

Figure 2 is a side view of one of the connector castings.

Figure 3:
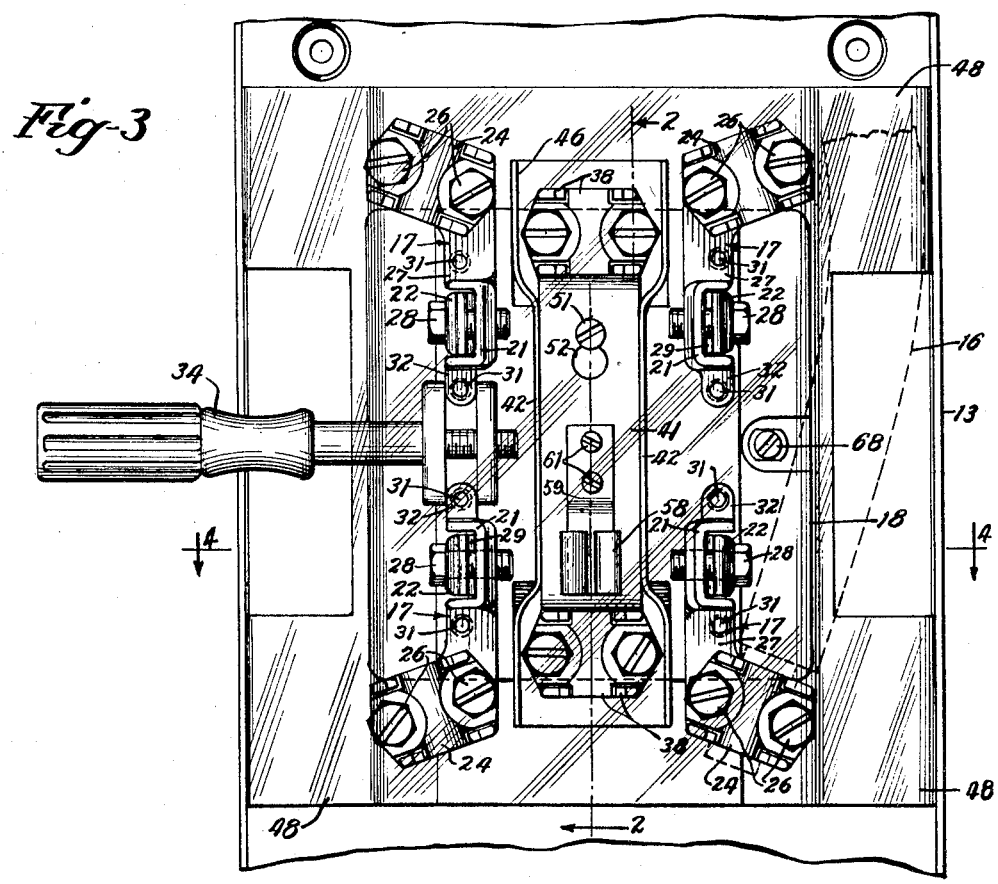
Figure 3 is a fragmentary view showing the face of the connector block assembly with a by-pass connection in place.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The illustrated form of the invention includes a watthour meter 11 protruding through a cover 12 of meter box 13, the latter usually being mounted on a wall. The meter-receiving aperture is sealed by a gasket. The meter box 13 has conduit 14 extending into it at top and bottom, each conduit having heavy cables or service conductors 16 extending therethrough for connection to one another through the meter. Each of the conductors 16 is connected to a connector unit 17 or 38 carried by an insulating terminal block 18.

The illustrated form of meter 11 is of the socket type having conventional terminal blades, not shown, extending rearwardly therefrom. Each of the connector units 17 includes a screw clamp portion 21, 22 for clamping one of these terminal blades on the meter.

The connector units 17 represent an important part of the joint invention. They make a firm pressure contact of low resistance with the service conductor and with the terminal blade and are of sufficiently heavy cross-section between them so that very little heat is developed within the connector units.

The end of each connector unit 17 engaging the service conductors is preferably approximately in the form of a commonly used connector clamp of the saddle type. Thus the conductor is laid in a channel 23 (Fig. 2) and a saddle type clamp bar 24 is applied over it. Screws 26 are then inserted and screwed into the main bar 27 of connector unit 17 to clamp the clamp bar 24 firmly onto the conductor.

The main bar 27 of the connector unit 17 is of heavy cross-section throughout its length from the groove 23 to the clamp portion 21, and preferably even to the upper end of the clamp portion 21. The terminal blade of the meter is pressed firmly against clamp portion 21 by a movable clamp jaw 22 which is urged against the terminal blade by a screw 28 threaded into the clamp portion 21. The portion 21, jaw 22 and screw 28 thus form a small vise. Not only does this reduce the generation of heat, but it also increases the removal of heat from the inside of the meter by heat conduction through the terminal blade and through the clamp jaws 21 and 22.

The connector unit 17 is secured to the insulating terminal block 18 by a pair of screws 31 passing through the terminal block and threaded into the connector unit 17. One of these screws threads into an outstanding lug 32 forming an integral part of the main bar 27. As will be observed from Fig. 3, the lugs 32 on the lower connector units 17 are aligned with similar lugs 32 on the upper connector units 17. These lugs are appropriately spaced so that the meter may be by-passed by applying a by-pass tool 34, as seen best in Fig. 3. Of course one such tool should be applied on each side of the terminal block so that each of the bottom conductors connected to connector units 17 is connected through the associated by-pass tool with the corresponding top conductor connected to the corresponding connector unit 17. If, as is often the case in heavy duty circuits, there is a third conductor, the lower and upper third conductors are respectively connected to the lower and upper connector clamps 38. As seen best in Fig. 3, the base portions 39 of these clamps are integral with a central conductor strap 41, so that these third conductors are connected together independently of the meter and do not need a by-pass tool.

Figure 4:
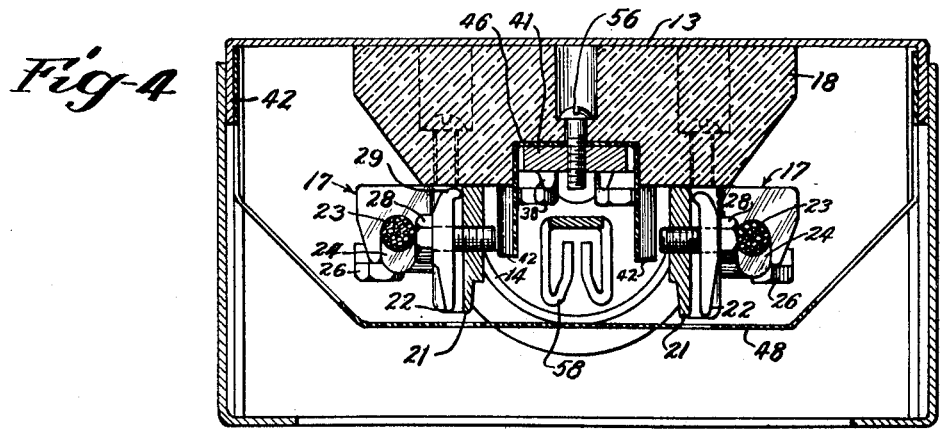
Figure 4 is a transverse horizontal sectional view taken approximately on the line 4—4 of Fig. 3, but with the cover applied, the meter nevertheless being omitted for clarity.

As seen in Figs. 1 and 4, the side wall 42 of meter box 13 is of such low height that it does not interfere with access of the by-pass tool 34 to the lugs 32. Accordingly, these tools may be in place whenever the cover 12 is removed. Should it be necessary to replace a meter while an installation is in service, the cover 12 is removed, the by-pass tools 34 are inserted from either side, slipped onto the lugs 32, and tightened thereon by a clamping action produced by turning the handle of tool 34, thus completing the by-pass. The clamp screws 28 may now be loosened, the meter slipped off and a new meter installed. Thereafter the screws 28 are tightened and the by-pass tools 34 removed.

It is desirable to insulate the parts more fully than they would be insulated merely by mounting them on the insulating block. Accordingly, a somewhat channel-shaped insulator 46 is inserted under the central conductor strap 41. This insulator 46 is inserted under the central conductor strap 41. This insulator preferably extends the full length of the central conductor strap 41 and beyond the clamp portions at the ends thereof. It thus prevents accidental bridging between the various conductive members either when working on the clamps on the various connector units or when applying the by-pass tool 34.

As seen best in Figs. 1, 2 and 4, a removable insulating shield 48 is preferably positioned over the entire terminal block assembly and exposed conductor ends. This substantially eliminates the danger of accidental contact with the electrical parts in applying the meter after the wiring has been completed. Some meter handlers hold a meter with their fingers extending around behind the base plate, being accustomed to a round socket or wall base which serves somewhat as a guide or protection.

The insulating shield 48 can conveniently be supported by one or more posts 49 of insulating material having buttons 51 at the end thereof which fit through keyhole slots 52 in the insulating shield 48. Other slots or holes are punched out of the insulating shield 48 to receive the terminal blades and associated insulating brackets 53, although these have been omitted from Fig. 3 for the sake of clarity. Both the insulating shield 48 and the insulator 46 may be made of a synthetic sheeting material, a transparent material such as cellulose acetate having been found convenient for reasons of visibility.

The sides of the shield 48 may be tucked within the side walls 42 of the box 13. This will hold the shield properly positioned when only one post 49 is used. The post 49 may conveniently be secured by screwing it onto the protruding end of screw 56 which holds central conductor strap 41 on terminal block 18.

Although the preferred form of the invention for two or three-wire circuits has been shown, it will be apparent that many changes may be made without departing from the spirit of the invention. Furthermore, the invention may be similarly embodied in a connecting block assembly for use with the seven-blade meters which are required for certain types of circuits.

The cover 12 of the meter box 13 may be removable in any suitable manner and may be provided with any suitable means for applying the conventional twisted wire and lead seal.

I claim:

1. By-pass facilities for socket-type electric meters having plug-in blades on the rear thereof, including a pair of blade-receiving and contacting means, conductor clamping means connected with each for making connection with a circuit to extend through the meter plugged-in in said blade-receiving means, and conductive lugs forming extensions on said blade-receiving means extending toward one another with their opposed ends aligned and exposed for joint clamping by a bridging by-pass clamp engaging opposite sides of both and of less height than the tips of the blade-receiving means with a clear space generally between the tips to provide for the passage of by-pass clamp means past said extensions and between said blade-receiving means and into engagement with the far side of the extensions for clamping thereon.

2. By-pass facilities for socket-type electric meters having plug-in blades on the rear thereof, including a pair of blade-receiving and contacting means, conductor clamping means connected with each for making connection with a circuit to extend through the meter plugged-in in said blade-receiving means, and conductive lugs forming extensions on said blade-receiving means extending toward one another with their opposed ends aligned and exposed for joint clamping by a bridging by-pass clamp engaging opposite sides of both and of less height than the tips of the blade-receiving means with a clear space generally between the tips to provide for the passage of by-pass clamp means past said extensions and between said blade-receiving means and into engagement with the far side of the extensions for clamping thereon, a box surrounding the blade-receiving and contacting means but having a side low enough to provide for projection of the outward part of a handle of a by-pass clamp on said formations past said side while the device is plugged in, and a cover for preventing access to said blades and blade-receiving means, said cover closing over said side in a manner to prevent closing of the cover with said handle so projecting, forming a cover for the full outer dimensions of the box and effective, when closed with said device in place, to prevent access to the interior of the box.

3. By-pass facilities for socket-type electric meters having plug-in blades on the rear thereof, including a pair of connecting units each including blade-receiving and contacting means, and conductor clamping means connected therewith for making connection with a circuit to extend through the meter plugged-in in said blade-receiving means, and a conductive extension forming a by-pass lug, the conductor clamping means being positioned generally in opposite directions from the blade receiving-means and by the by-pass lugs being located closer together than the blade-receiving means with opposed edges aligned and exposed for joint clamping by a bridging by-pass clamp engaging opposite sides of both lugs, and being positioned close to the blade-receiving means and so positioned that when a meter is plugged-in in said blade-receiving means, a clear space is provided adjacent the lugs wider than the spacing between the lugs to provide for the passage of by-pass clamp means behind said meter past said lugs and into engagement with the far side of the lugs for clamping thereon.

References Cited in the file of this patent

UNITED STATES PATENTS

| | | |
|---|---|---|
| 1,985,048 | McIllvaine | Dec. 18, 1934 |
| 2,030,522 | Johansson | Feb. 11, 1936 |
| 2,231,677 | Mylius | Feb. 11, 1941 |
| 2,407,372 | Johansson | Sept. 10, 1946 |
| 2,572,753 | Pahal | Oct. 23, 1951 |
| 2,588,558 | Mosimann | Mar. 11, 1952 |